(12) United States Patent
Check et al.

(10) Patent No.: US 6,591,179 B1
(45) Date of Patent: Jul. 8, 2003

(54) METHOD AND SYSTEM FOR PROGRESSIVE ENGAGEMENT OF ALL-WHEEL DRIVE

(75) Inventors: Michael J. Check, Ann Arbor, MI (US); Eric E. Krueger, Ann Arbor, MI (US); Steven P. Loudon, Howell, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/040,329

(22) Filed: Jan. 4, 2002

(51) Int. Cl.[7] .................................. B60T 7/12

(52) U.S. Cl. .............................. 701/91; 82/89; 180/248

(58) Field of Search ............................ 701/91, 69, 70, 701/71, 72, 74, 75, 82, 83, 84, 90; 180/234, 245, 246, 248, 249

(56) References Cited

U.S. PATENT DOCUMENTS

| | | | |
|---|---|---|---|
| 5,648,903 A | 7/1997 | Liubakka |
| 5,707,117 A | 1/1998 | Hu et al. |
| 6,161,905 A | 12/2000 | Hac et al. |
| 6,169,951 B1 | 1/2001 | Ghoneim et al. |
| 6,182,002 B1 | 1/2001 | Bauerle et al. |
| 6,189,643 B1 | 2/2001 | Takahashi et al. |
| 6,195,606 B1 | 2/2001 | Barta et al. |
| 6,208,929 B1 | 3/2001 | Matsuno et al. |
| 6,212,461 B1 | 4/2001 | Ghoneim et al. |

*Primary Examiner*—Richard M. Camby
(74) *Attorney, Agent, or Firm*—Scott A. McBain

(57) ABSTRACT

The invention provides a method of progressive engagement of all-wheel drive for a mobile vehicle. A set of vehicle parameters is sensed, and an all-wheel drive lock value is determined based on the sensed set of vehicle parameters. Vehicle subsystem control activation is determined, and the all-wheel drive lock value is adjusted based on the vehicle subsystem control activation determination. An all-wheel drive controller is engaged based on the adjusted all-wheel drive lock value.

21 Claims, 2 Drawing Sheets

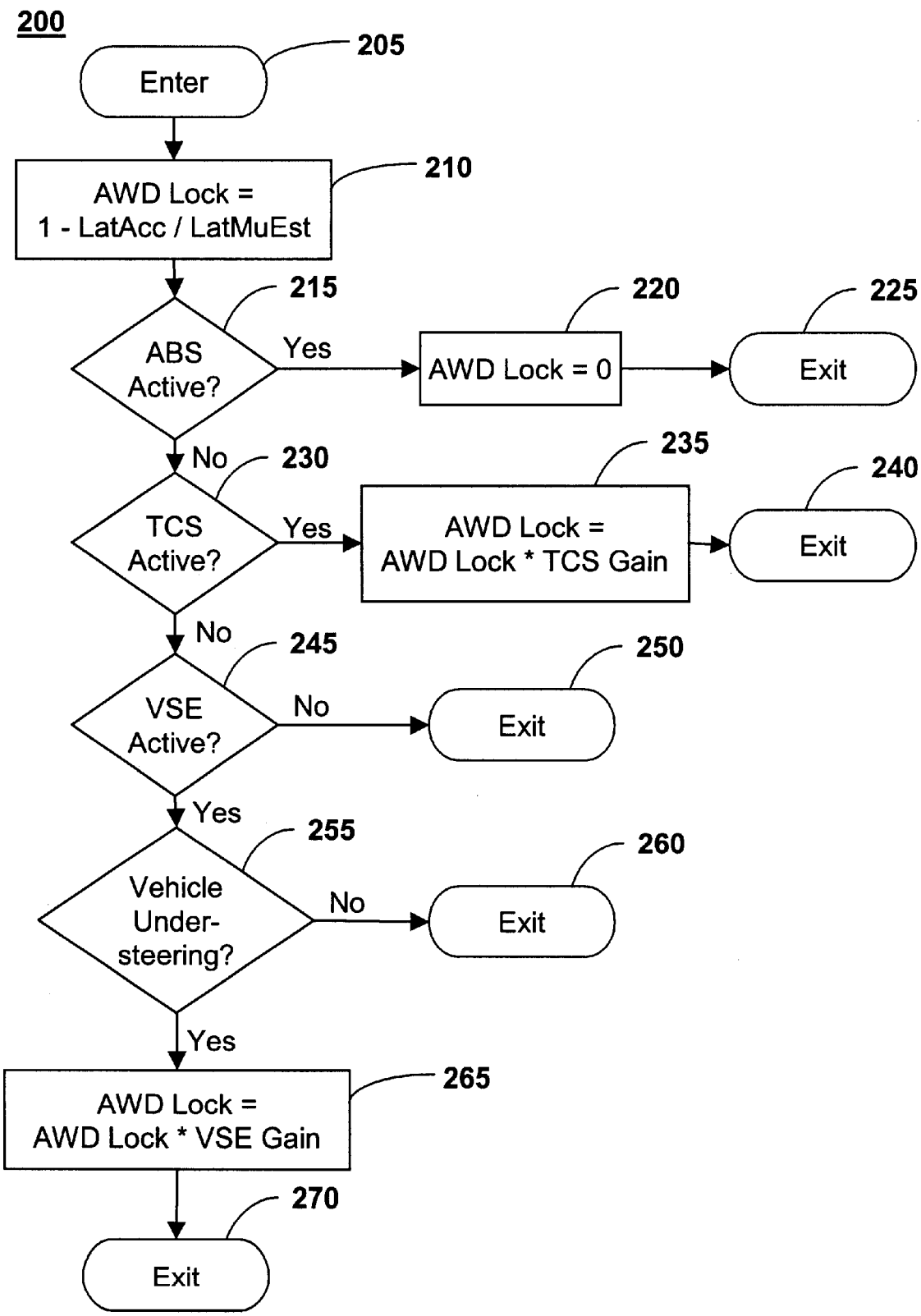

METHOD AND SYSTEM FOR PROGRESSIVE ENGAGEMENT OF ALL-WHEEL DRIVE

TECHNICAL FIELD

This invention relates generally to the field of vehicular control, and in particular, to a method and system for progressive engagement of an all-wheel drive for a mobile vehicle.

BACKGROUND OF THE INVENTION

All-wheel drive (AWD) systems use a center differential that allows the level of locking between the front and rear axles to be controlled. When the differential is totally unlocked, the vehicle stability in a turn may be maximized since the wheel speeds can be controlled by a Vehicle Stability Enhancement (VSE) subsystem without affecting the other axle. When the differential is totally locked, the traction of the vehicle is maximized since traction forces are supplied to all four wheels at a similar level. The optimal amount of locking should maintain a balance between the stability of the vehicle, the amount of all-wheel drive traction available, and driver comfort.

In order to achieve satisfactory vehicular performance under all road conditions, a control algorithm should provide variable engagement of AWD systems. When AWD systems are engaged without any estimates of surface capability, driver command, and vehicle state, instability of the vehicle may result or driver comfort may be negatively affected. Accordingly, it would be beneficial to have a system and method for using data from existing VSE subsystems such as yaw rate, lateral acceleration, and sensed wheel speed to provide these estimates, thereby engaging the AWD in a progressive manner to maintain stability and traction and to enhance the comfort of the vehicle user.

Furthermore, it would be beneficial to consider and incorporate the status of other vehicle subsystems, such as an anti-lock braking subsystem and a traction control subsystem, to produce smooth, progressive engagement and disengagement of an all-wheel drive system under varying road conditions and driver demands.

The object of this invention, therefore, is to provide a method and a system for progressive engagement of all-wheel drive, and to overcome the deficiencies and obstacles described above.

SUMMARY OF THE INVENTION

One aspect of the current invention provides a method of progressive engagement of all-wheel drive for a mobile vehicle. The method may include the steps of sensing a set of vehicle parameters, determining an all-wheel drive lock value based on the sensed set of vehicle parameters, determining vehicle subsystem control activation, adjusting the all-wheel drive lock value based on the vehicle subsystem control activation determination, and engaging an all-wheel drive controller based on the adjusted all-wheel drive lock value.

The sensed set of vehicle parameters may include lateral acceleration, steering wheel angle, yaw rate, and wheel speed. The all-wheel drive lock value may be based on a ratio of a sensed lateral acceleration and a surface capability value. The surface capability value may be computed from the sensed set of vehicle parameters.

The vehicle subsystem control activation determination may include determining whether a vehicle anti-lock brake subsystem is active, and adjusting the all-wheel drive lock value to an unlocked condition when the vehicle anti-lock brake subsystem is active. The vehicle subsystem control activation determination may include determining whether a vehicle traction control subsystem is active, and adjusting the all-wheel drive lock value based on a traction control subsystem gain value when the vehicle traction control subsystem is active. The traction control subsystem gain value may be a function of the surface capability value.

The vehicle subsystem control activation determination may include determining whether a vehicle stability enhancement subsystem is active, and adjusting the all-wheel drive lock value based on a stability enhancement subsystem gain value when the vehicle stability enhancement subsystem is active. The stability enhancement subsystem gain value may be a function of the surface capability value.

Adjustments to the all-wheel drive lock value may not be made when it is determined that the anti-lock brake subsystem is not active, the traction control subsystem is not active, and the vehicle stability enhancement subsystem is not active.

Another aspect of the current invention is a computer usable medium including a program for progressive engagement of an all-wheel drive. The computer program may include code to determine an all-wheel drive lock value based on the sensed set of vehicle parameters. The computer program may include code to determine vehicle subsystem control activation. The computer program may include code to adjust the all-wheel drive lock value based on the vehicle subsystem control activation determination. The computer program may include code to engage an all-wheel drive controller based on the adjusted all-wheel drive lock value.

The computer program may include program code to sense a set of vehicle parameters including lateral acceleration, steering wheel angle, yaw rate, and wheel speed. The computer program may include code to determine the all-wheel drive lock value based on a ratio of a sensed lateral acceleration and a surface capability value.

The computer program may include code to determine the surface capability value computed from the sensed set of vehicle parameters.

The computer program may include code to determine vehicle subsystem control activation that includes determining whether a vehicle anti-lock brake subsystem is active, and adjusting the all-wheel drive lock value to an unlocked condition when the vehicle anti-lock brake subsystem is active.

The computer program may include code to determine vehicle subsystem control activation that includes determining whether a vehicle traction control subsystem is active, and adjusting the all-wheel drive lock value based on a traction control subsystem gain value when the vehicle traction control subsystem is active. The computer program may further include code to determine the traction control subsystem gain value, which may be a function of the surface capability value.

The computer program may include code to determine vehicle subsystem control activation that comprises determining whether a vehicle stability enhancement subsystem is active, and adjusting the all-wheel drive lock value based on a stability enhancement subsystem gain value when the vehicle stability enhancement subsystem is active. The computer program may include code to determine the stability enhancement subsystem gain value, which may be a function of the surface capability value.

The computer program may include code to make no adjustment to the all-wheel drive lock value when it is determined that the anti-lock brake subsystem is not active, the traction control subsystem is not active, and the vehicle stability enhancement subsystem is not active.

Another embodiment of the current invention includes a system for progressive engagement of an all-wheel drive, including a means for sensing a set of vehicle parameters; a means for determining an all-wheel drive lock value based on the sensed set of vehicle parameters; a means for determining vehicle subsystem control activation; a means for adjusting the all-wheel drive lock value based on the vehicle subsystem control activation determination; and a means for engaging an all-wheel drive controller based on the adjusted all-wheel drive lock value.

The invention provides the foregoing and other features, and the advantages of the invention will become further apparent from the following detailed description of the presently preferred embodiments, read in conjunction with the accompanying drawings. The detailed description and drawings are merely illustrative of the invention and do not limit the scope of the invention, which is defined by the appended claims and equivalents thereof.

BRIEF DESCRIPTION OF THE DRAWINGS

FIG. 2 is a flow chart of one embodiment of a method of progressive engagement of an all-wheel drive system, in accordance with the current invention.

DETAILED DESCRIPTION OF THE PRESENTLY PREFERRED EMBODIMENTS

Figure 1:
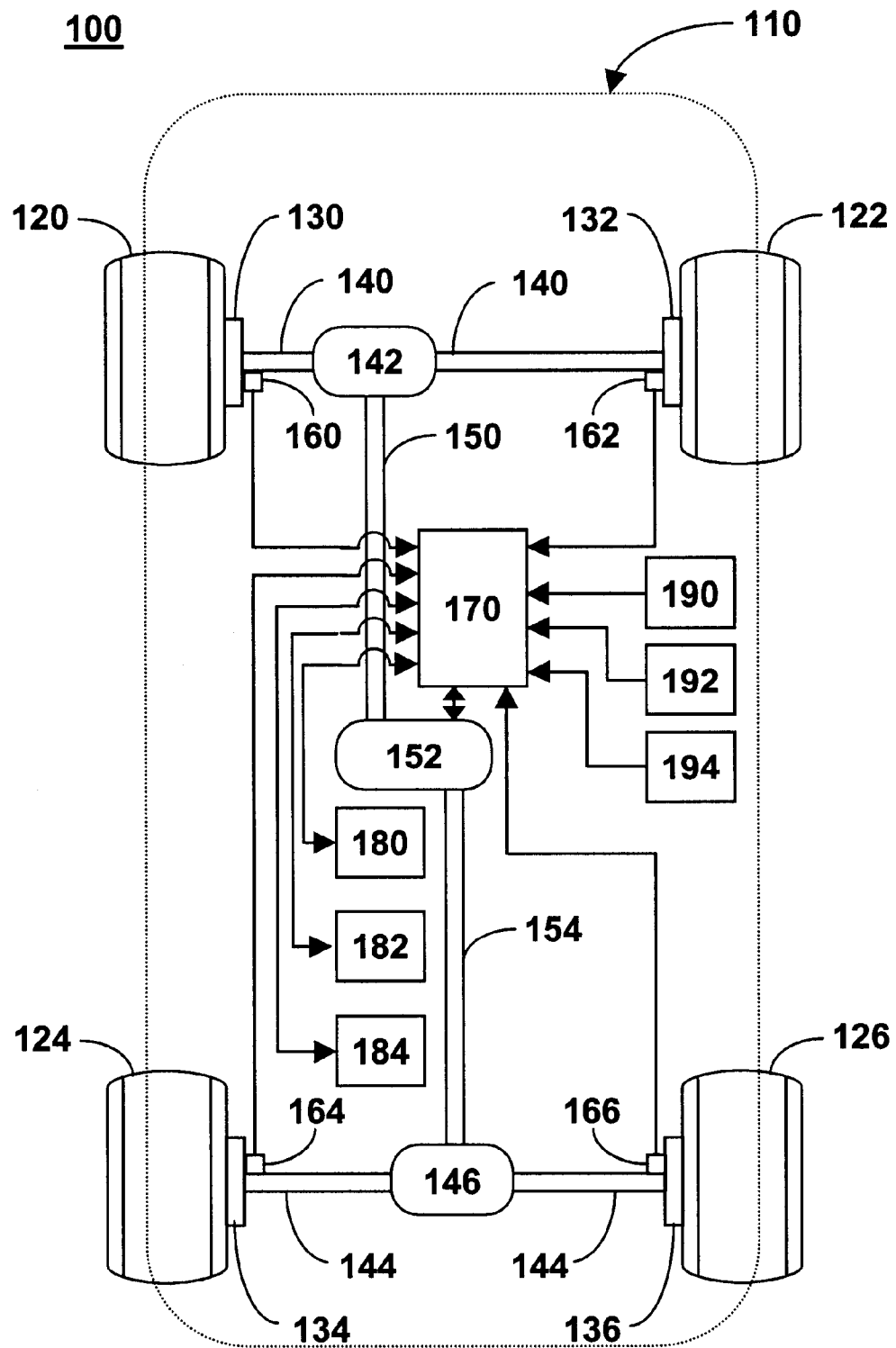
FIG. 1 is a schematic diagram of one embodiment of a system for progressive engagement of an all-wheel drive system, in accordance with the current invention.

FIG. 1 shows a schematic diagram of one embodiment of a system to progressively engage an all-wheel drive of a motor vehicle, in accordance with the present invention at 100.

Vehicle 110 may have wheels 120, 122, 124 and 126 with respective brakes 130, 132, 134 and 136. Front wheel 120 and brake 130 are mounted on the left side of front axle 140 and front wheel 122 and brake 132 are mounted on the right side. Rear wheel 124 and brake 134 are mounted on the left side of rear axle 144 and rear wheel 126 and brake 136 are mounted on the right side.

Drive shaft 150 connects front differential 142 of front axle 140 to center differential 152, and drive shaft 154 connects rear differential 146 of rear axle 144 to center differential 152. Center differential 152 via drive shafts 150 and 154 may control a locking level between front differential 142 and rear differential 146, thereby permitting front wheels 120, 122 and rear wheels 124, 126 to rotate at different speeds.

Wheels 120, 122, 124 and 126 may have respective wheel-speed sensors 160, 162, 164 and 166, which send wheel speed signals to one or more digital signal processors (DSP) 170. DSP 170 may be a computer, microcomputer, electronic control unit, microprocessor or microcontroller, with read-only memory (ROM) and random access memory (RAM) and appropriate input and output circuits. DSP 170 may be any suitable hardware and software capable of progressively engaging, disengaging, and controlling an all-wheel drive. DSP 170 may send a signal to an all-wheel drive or center differential controller. The signal may be, for example, a pulse-width modulated (PWM) signal, or a digital bit stream. The controller may be an integral part of center differential 152.

DSP 170 may be connected to, respond to and process signals from a controller of center differential 152. DSP 170 may respond to and process signals from various vehicle subsystems including an anti-lock brake subsystem (ABS) 180, a traction control subsystem (TCS) 182 and a vehicle stability enhancement subsystem (VSE) 184.

ABS 180 may be an electromechanical control system designed to monitor and influence wheel dynamics, and ultimately vehicle dynamics during braking maneuvers. ABS 180 may enhance vehicle stability, prevent oversteering and understeering, increase steerability and improve stopping distance. ABS 180 may include wheel-speed sensors 160, 162, 164 and 166, a microcontroller containing the algorithm for processing the wheel speed information, a series of solenoid-driven valves, and a pump-motor subsystem that may be actuated to interrupt and release brake fluid pressure from the wheel-end brake components (calipers and such).

ABS 180, which may cycle through a test sequence hundreds of times per second, may sense when one or more wheels are locked up during braking and may regulate the braking force, preventing locking of brakes after, for example, sudden braking. ABS 180 may monitor the speed of each of the four wheels and detect wheel slip to reduce the braking force to wheels with a high slip and to aid vehicle control while braking. ABS 180 may operate by momentarily releasing brake fluid pressure from the brake caliper just before the wheel locks up. By measuring the deceleration rate at the wheel, an impending lock-up may be sensed. Wheel-speed sensors 160, 162, 164 and 166 may provide wheel speed input to DSP 170 via the ABS control system, or may provide wheel speed input directly to DSP 170. ABS 180 may provide control and status information to DSP 170. The microcontroller functions for the anti-lock brake subsystem may be contained in DSP 170.

TCS 182 may be an electromechanical control system designed to monitor and influence wheel dynamics, and ultimately vehicle dynamics during acceleration maneuvers. TCS 182 may consist of wheel-speed sensors 160, 162, 164 and 166 along with a microcontroller containing the algorithm for processing the wheel-speed information, a series of solenoid-driven valves, and a pump-motor subsystem that may be actuated to build, hold and release brake fluid pressure from the wheel-end brake components. TCS 182 may apply the brakes or reduce engine power to control wheel slippage on wet, icy or slick surfaces. For example, TCS 182 may help prevent front-wheel spin on slippery or gravel surfaces during acceleration at speeds up to 25 mph. TCS 182 may provide control and status information to DSP 170. DSP 170 may provide microcontroller functions for TCS 182.

VSE 184, also referred to as an electronic stability program (ESP), may be an electromechanical control system designed to monitor and influence wheel dynamics, and ultimately vehicle dynamics during a vehicle state of braking, accelerating or coasting. In addition to the sensors and hardware used by ABS 180 and TCS 182, VSE 184 typically uses additional input from a steering-wheel-angle sensor 190, yaw-rate sensor (or vehicle rotation rate sensor) 192 and lateral-acceleration sensor (or lateral accelerometer) 194 when determining the driver's intended heading and the vehicle's actual heading. Once the system determines a significant difference between the two, the solenoid-driven valves and pump-motor subsystem may be actuated to build, hold and release brake fluid pressure at individual wheel-end brake components, creating asymmetric (cross-vehicle) brake forces in an attempt to create yaw moments, turning the vehicle toward the driver's intended path. In other words, VSE 184 may be designed to identify the intent of a user by measuring the steering wheel angle, brake and throttle positions and vehicle speed. When a response of the vehicle does not match what the driver intended, the system may automatically apply or release a brake at the corners of the vehicle independently.

VSE 184 may control the application of a brake on a single wheel, as necessary, to help a driver regain control in a skid caused by oversteering or understeering on a curve. VSE 184 may introduce a steering correction to a steering angle commanded by a vehicle driver in an effort to improve vehicle directional stability. Vehicle stability enhancement may be performed, for example, by applying brake pressure to one wheel, conventionally the front wheel on the outside of the turn when the vehicle is oversteering, and the rear wheel on the inside of the turn when the vehicle is understeering. For example, Vehicle stability enhancement also may reduce vehicle spins and excessive understeer, decreasing the difference between a requested direction and the actual vehicle direction. Progressive engagement of all-wheel drive may further improve the performance of the vehicle stability enhancement subsystem, by allowing variable control between the front and rear drive shafts. When the center differential is totally unlocked, the vehicle stability in a turn may be maximized since the speed of a wheel may be controlled by the VSE 184 without affecting the wheels of the other axle.

VSE 184 may use various sensors to look at the difference between a requested direction of the driver and the yaw rate, and then may manage individual wheel braking to bring the vehicle back toward the requested direction. VSE 184 may provide control and status information to DSP 170. The microcontroller functions for the vehicle stability enhancement subsystem may be contained in DSP 170.

DSP 170 may respond to and process signals from various sensors, including wheel-speed sensors 160, 162, 164 and 166, steering-wheel-angle sensor 190, yaw-rate sensor 192, and lateral-acceleration sensor 194. These sensors may be included in subsystems such as ABS 180, TCS 182 and VSE 184.

DSP 170 may contain one or more programs that direct when and how to activate one or more subsystems including anti-lock brake subsystem (ABS) 180, traction control subsystem (TCS) 182, and vehicle stability enhancement (VSE) subsystem 184.

DSP 170 may include a program to progressively engage an all-wheel drive. This program may include code that determines an all-wheel lock value (AWD Lock) based on a set of parameters received from sensors including wheel-speed sensors 160, 162, 164, and 166, steering-wheel-angle sensor 190, yaw-rate sensor 192 and lateral acceleration sensor 194. The AWD Lock parameter may determine the level of locking between front differential 142 and rear differential 146. When the AWD Lock parameter is zero, the front and rear differentials may be fully unlocked and operate independently. When the AWD Lock parameter is one, the front and rear differentials may be fully locked and equally engaged.

Steering-wheel-angle sensor 190 may provide information on the position or angle of the steering wheel. Typically, it may be mounted inside the steering column and may include a patterned disk that interrupts a light beam.

Yaw-rate sensor 192 may provide information on the angular rate (about a vertical axis) of a vehicle and may assist in determining an estimate of surface capability and how far off-axis a car is tilting in a turn. Yaw-rate sensor 192 may be designed as, for example, a mechanical gyroscope, where two pairs of piezoelectric elements are used to excite oscillations at four nodes in a tiny metal cylinder. When this type of mechanical yaw-rate sensor 192 is subjected to a rotation about its axis, a Coriolis acceleration (perpendicular to the rotation) changes the oscillating motion of the cylinder, which may be detected by a third pair of piezoelectric elements that monitor the motions of a cylinder. Yaw-rate sensor 192 may be designed as, for example as a micromechanical silicon-based yaw-rate device.

Lateral-acceleration sensor 194 may provide data on lateral acceleration (side-to-side) of the vehicle. Lateral acceleration may occur, for example, when turning or cornering. Information on the cornering force may come from, for example, a simple pendulum attached to a spring that swings a magnet past a Hall effect (magnetic field) sensor. Lateral-acceleration sensor 194 may be a silicon-based piezoresistive device mounted in the vehicle.

DSP 170 may include a program to adjust the AWD Lock value based on a determination of ABS 180, TCS 182, or VSE 184. The AWD Lock value may be adjusted depending on the activation status of the subsystems.

DSP 170 may contain program code to determine whether ABS 180, TCS 182 or VSE 184 is active. DSP 170 may determine, for example, vehicle status, surface coefficient of adhesion, and an estimate of road surface capacity with information sent from ABS 180, TCS 182, and VSE 184. DSP 170 may receive sensor information directly from steering-wheel-angle sensor 190, yaw-rate sensor 192, lateral-acceleration sensor 194, and wheel-speed sensors 160, 162, 164 and 166.

For example, with sensor-based computer applications, DSP 170 may predict the path of a vehicle using measurements and input from electronic sensors including steering-wheel-angle sensor 190, yaw-rate sensor 192, lateral-acceleration sensor 194, and wheel-speed sensors 160, 162, 164 and 166. DSP 170 may include program code to determine that no adjustment to the lock value should be made when ABS 180, TCS 182 or VSE 184 are inactive.

FIG. 2 shows a flow chart of one embodiment of a method to progressively or variably engage an all-wheel drive system, in accordance with the present invention at 200. The method may provide an optimal amount of locking to maintain a balance between the stability of the vehicle and the amount of all-wheel drive traction available, and driver comfort.

Vehicle 110 may enter into the process of activating an all-wheel drive system progressively, as seen at block 205. With respect to the desired percentage of all-wheel drive engagement, DSP 170 may perform a calculation for the optimal percentage of engagement of the AWD system, and more particularly, the percentage of differential lock, as seen at block 210. This lock value, which may be a ratio of a sensed lateral acceleration and a surface capability value, may be used to determine the proper engagement of center differential 152 to front drive shaft 150 and rear drive shaft 154. An estimate of surface capability may be derived from the various vehicle motion sensors from VSE 184. A value for the percentage of engagement or lock of the AWD system may be calculated according to the formula:

$$\text{AWD Lock} = 1 - \text{LatAcc}/\text{LatMuEst} \qquad (1)$$

where LatAcc is a lateral acceleration value, and LatMuEst is a lateral road surface adhesion estimate derived from the yaw rate and lateral acceleration value that may be compensated for a lateral load shift. LatMuEst may be referred to as a surface capability value, and may be computed from a set of sensor inputs including lateral acceleration, steering wheel angle, yaw rate and wheel speed. The ratio of lateral acceleration to the surface capability value may be used to determine the desired base percentage of differential lock. The lateral surface estimate may not be less than the lateral acceleration, to constrain the AWD Lock values to positive numbers. A more complete description of the surface capability value computation may be found in U.S. patent application Ser. No. 09/769,676, filed Jan. 25 2001, herein incorporated by reference.

The surface capability value may be determined in combination with a look-up table. Values in the table may be established during the development of the mobile vehicle, and may be updated, for example, with alterations in the model design, vehicle configuration, or with user preferences. Table values may include points corresponding to specific sensor input values, and the computed LatMuEst value interpolated or extrapolated from the set of sensor inputs when not matching identically with any table values.

ABS 180 may or may not be activated as seen at block 215. When ABS 180 is active, the AWD Lock value may be set to zero to unlock the center differential, as seen at block 220. Optimal ABS performance may require a completely unlocked differential. At this point, the method for determining the AWD Lock value may be exited, as seen at block 225.

When ABS 180 is not active and unlocked, TCS 182 may or may not be active, as seen at block 230. When TCS 182 is active, the TCS activation may require an adjustment to the base AWD Lock term to optimize performance. To reduce the potential for excessive torque transfer and to minimize the effect of TCS 182 contributing to an oversteer condition, the AWD Lock term may be adjusted using a gain value based on the lateral surface estimate. As seen at block 235, the AWD Lock term may be adjusted according to the formula:

$$\text{AWD Lock} = \text{AWD Lock} * \text{TCS Gain} \qquad (2)$$

where $0 \leq \text{TCS Gain} \leq 2$, and the current AWD Lock, the percentage of the differential lock engagement, is multiplied by the TCS Gain, to calculate a new percentage. The TCS Gain value may be a function of LatMuEst. The locking of the center differential may be set at the new percentage, and the process of engaging the VSE system may be exited, as seen at block 240. The TCS Gain value may be limited, for example, to a value of two. The adjusted AWD Lock, however, may not be greater than one. When the differential is totally locked, i.e. AWD Lock=1, the traction of the vehicle may be maximized since the traction force is supplied to all four wheels at a similar level.

When ABS 180 and TCS 182 are not active, VSE 184 may or may not be active, as seen at block 245. When VSE 184 is not active, the algorithm may be exited with no adjustments to the percentage engagement of the AWD system, as seen at block 250.

When VSE 184 is active, it may function by dividing, modulating or partitioning brake application across two wheels, i.e., two inside wheels in an understeer condition or two outside wheels in an oversteer condition. VSE corrections may reduce the pitch of the vehicle during, for example, oversteer control.

The vehicle may or may not be understeered, as seen at block 255. When it is not being understeered, the algorithm may be exited with no adjustment to the percentage of the differential lock, as seen at block 260.

When the vehicle is in an understeer condition, the percentage of AWD engagement may be recalculated. The new percentage is calculated with $$\text{AWD Lock} = \text{AWD Lock} * \text{VSE Gain} \qquad (3)$$

where the current AWD Lock value may be multiplied by a vehicle stability enhancement gain value, the VSE Gain, as seen at block 265. The VSE Gain value may be between 0 and 2 and is a function of LatMuEst. When the vehicle is understeered, the VSE Gain value may increase the percentage of the all-wheel drive lock engagement. When the vehicle is neither understeered nor oversteered, the VSE Gain value may be set to one and no adjustment would be made to the AWD Lock value. In an oversteer condition, the AWD Lock value may remain unadjusted.

After the percentage of engagement of the all-wheel drive has been adjusted, the process of engaging the all-wheel drive may be exited, as seen at block 270 and, as necessary, may be repeated again from block 205 onward. The measurements, calculation and adjustments to the AWD Lock value may occur hundreds of times per second.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of progressive engagement of all-wheel drive for a mobile vehicle, comprising:
    sensing a set of vehicle parameters;
    determining an all-wheel drive lock value based on the sensed set of vehicle parameters;
    determining vehicle subsystem control activation;
    adjusting the all-wheel drive lock value based on the vehicle subsystem control activation determination;
    engaging an all-wheel drive controller based on the adjusted all-wheel drive lock value; and
    controlling at least one differential based on the adjusted all-wheel drive lock value.

2. The method of claim 1 wherein the sensed set of vehicle parameters comprises lateral acceleration, steering wheel angle, yaw rate, and wheel speed.

3. The method of claim 1 wherein the all-wheel drive lock value is based on a ratio of a sensed lateral acceleration and a surface capability value.

4. The method of claim 3 wherein the surface capability value is computed from the sensed set of vehicle parameters.

5. The method of claim 1 wherein the vehicle subsystem control activation determination comprises determining whether a vehicle anti-lock brake subsystem is active, and adjusting the all-wheel drive lock value to an unlocked condition if the vehicle anti-lock brake subsystem is active.

6. The method of claim 1 wherein the vehicle subsystem control activation determination comprises determining whether a vehicle traction control subsystem is active, and adjusting the all-wheel drive lock value based on a traction control subsystem gain value if the vehicle traction control subsystem is active.

7. The method of claim 6 wherein the traction control subsystem gain value is a function of the surface capability value.

8. The method of claim 1 wherein the vehicle subsystem control activation determination comprises determining whether a vehicle stability enhancement subsystem is active, and adjusting the all-wheel drive lock value based on a stability enhancement subsystem gain value if the vehicle stability enhancement subsystem is active.

9. The method of claim 8 wherein the stability enhancement subsystem gain value is a function of the surface capability value.

10. The method of claim 1 wherein no adjustment to the all-wheel drive lock value is made if it is determined that the anti-lock brake subsystem is not active, the traction control subsystem is not active, and the vehicle stability enhancement subsystem is not active.

11. A computer usable medium including a program for progressive engagement of all-wheel drive, comprising:

computer program code to determine an all-wheel drive lock value based on the sensed set of vehicle parameters;

computer program code to determine vehicle subsystem control activation;

computer program code to adjust the all-wheel drive lock value based on the vehicle subsystem control activation determination; and computer program code to engage an all-wheel drive controller based on the adjusted all-wheel drive lock value;

computer program code to control at least one differential based on the adjusted all-wheel drive lock value.

12. The computer usable medium of claim 11 wherein the sensed set of vehicle parameters comprises lateral acceleration, steering wheel angle, yaw rate, and wheel speed.

13. The computer usable medium of claim 11 wherein the all-wheel drive lock value is based on a ratio of a sensed lateral acceleration and a surface capability value.

14. The computer usable medium of claim 13 wherein the surface capability value is computed from the sensed set of vehicle parameters.

15. The computer usable medium of claim 11 wherein the vehicle subsystem control activation determination comprises determining whether a vehicle anti-lock brake subsystem is active, and adjusting the all-wheel drive lock value to an unlocked condition if the vehicle anti-lock brake subsystem is active.

16. The computer usable medium of claim 11 wherein the vehicle subsystem control activation determination comprises determining whether a vehicle traction control subsystem is active, and adjusting the all-wheel drive lock value based on a traction control subsystem gain value if the vehicle traction control subsystem is active.

17. The computer usable medium of claim 16 wherein the traction control subsystem gain value is a function of the surface capability value.

18. The computer usable medium of claim 11 wherein the vehicle subsystem control activation determination comprises determining whether a vehicle stability enhancement subsystem is active, and adjusting the all-wheel drive lock value based on a stability enhancement subsystem gain value if the vehicle stability enhancement subsystem is active.

19. The computer usable medium of claim 18 wherein the stability enhancement subsystem gain value is a function of the surface capability value.

20. The computer usable medium of claim 11 wherein no adjustment to the all-wheel drive lock value is made if it is determined that the anti-lock brake subsystem is not active, the traction control subsystem is not active, and the vehicle stability enhancement subsystem is not active.

21. A system for progressive engagement of all-wheel drive, comprising:

means for sensing a set of vehicle parameters;

means for determining an all-wheel drive lock value based on the sensed set of vehicle parameters;

means for determining vehicle subsystem control activation;

means for adjusting the all-wheel drive lock value based on the vehicle subsystem control activation determination;

means for engaging an all-wheel drive controller based on the adjusted all-wheel drive lock value, and means for controlling at least one differential based on the adjusted all-wheel drive lock value.

* * * * *